June 26, 1934.   A. J. LEWIS   1,964,361
CHIP REMOVER FOR METAL WORKING MACHINES
Filed Feb. 21, 1933   2 Sheets-Sheet 1

INVENTOR.
ARTHUR J. LEWIS
ATTORNEYS.

June 26, 1934.    A. J. LEWIS    1,964,361
CHIP REMOVER FOR METAL WORKING MACHINES
Filed Feb. 21, 1933    2 Sheets-Sheet 2
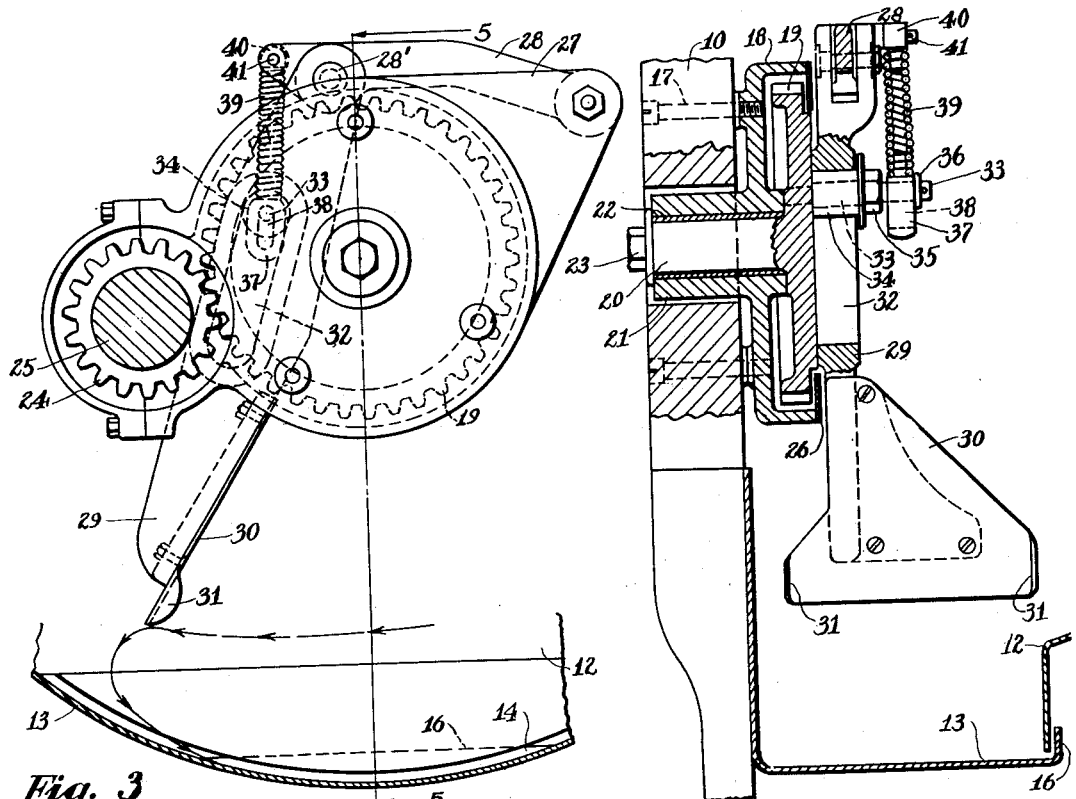
Fig. 3
Fig. 5
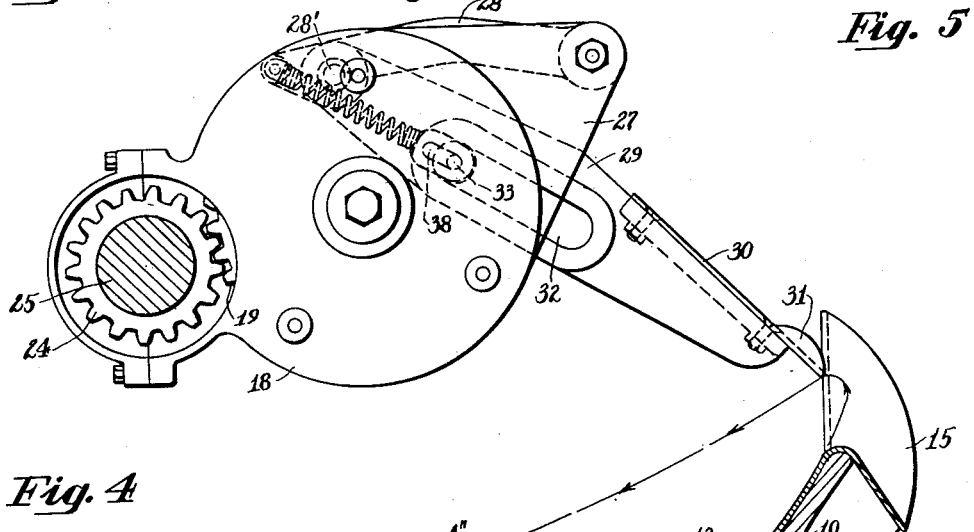
Fig. 4
INVENTOR.
ARTHUR J. LEWIS
BY
ATTORNEYS.

Patented June 26, 1934

1,964,361

UNITED STATES PATENT OFFICE 1,964,361

CHIP REMOVER FOR METAL WORKING MACHINES

Arthur J. Lewis, Stratford, Conn., assignor to The Baird Machine Company, Bridgeport, Conn., a corporation of Connecticut Application February 21, 1933, Serial No. 657,773

17 Claims. (Cl. 29—57)

This invention relates to metal-working machines such as lathes, and has particular reference to apparatus for separating the metal chips from the usual tool lubricant and removing them from the container in which they collect.

In operating a large metal-working machine, such as multiple-spindle lathe or chucking machine, the scrap collects rapidly and must be removed frequently to prevent clogging of the machine and damming the outflow of the tool lubricant. The old method of manually raking the chips out of the machine has been largely replaced in the more modern establishments, especially where batteries of machines are employed, by mechanical chip-removing devices in which a screw or chain, slot or belt conveyor continuously discharges the scrap from the machine during its operating periods. These forms of chip-removing devices are operative for removing a particular type of chip but are useless for removing other types of chips, so that the range of usefulness of the entire machine may be restricted by the limitations of the chip-removing device. Also, the operating mechanism of these chip-removing devices is so located that chips frequently lodge between the parts and cause the mechanism to jam, and since the scrap-engaging means is usually rigidly arranged, any retardation of the movements thereof due to clogging of the chips is likely to injure the operating mechanism, so that the usual devices of this nature frequently require more attention than their function warrants.

In accordance with the present invention, apparatus for removing tooling chips and other scrap from metal-working machines is provided, which removes all types of scrap with equal facility and accordingly may be used on practically any form of metal-working machine without regard to the changes in the nature of the work which the machine is required to perform. Also, the operating mechanism of the new apparatus is out of contact with the scrap so that chips cannot lodge in and consequently jam the mechanism, and the scrap-engaging means, while positively driven, is nevertheless sufficiently resilient to prevent injury to the operating mechanism in the event that the chips clog or jam in such a way as to retard the free movement of the scrap-engaging means along its prescribed course. The chips are also separated from the tool lubricant in the new apparatus, so that the lubricant may be used over again.

A preferred embodiment of the invention comprises a reciprocating chip- or scrap-raking blade, which is driven in one direction during the working stroke over the curved bottom of a chip or scrap receiving basin, so as to rake the chips or scrap over the edge thereof into a spout, and being driven in the opposite direction during the return stroke in a position elevated above the basin out of contact with the material collecting therein. The blade is pivoted at its upper end on a movable link, and is flexibly connected to a rotating crank pin in such a way that the blade is urged downwardly by gravity into contact with the scrap, which it engages with increasing pressure during the working stroke to compensate for the increasing weight of the scrap being gathered by the blade, the flexible connection between the blade and the crank pin yielding in accordance with any substantial resistance offered by jammed or unusually large pieces of scrap, so that injury to the blade or its operating mechanism is prevented. The operating mechanism is elevated well above the chip- or scrap-collecting sump so that chips cannot lodge therein to jam or injure the mechanism.

The chip- or scrap-collecting basin preferably is located at an appropriate level so that the tool or cutting lubricant will flush the chips or other scrap into the basin, or, the basin may be so arranged that the solid material will fall and the lubricant will flow into it, or, the basin may be appropriately mounted in the discharge trough of an existing machine, depending upon the arrangement thereof. Preferably, the basin is arranged as a false bottom in a lubricant-collecting reservoir, the lubricant decanting over a dam formed by the basin, which excludes the passage of the chips or other scrap, so that they remain in the basin.

It will be seen that the new chip-removing apparatus of this invention may be used with equal effectiveness upon practically any form of machine for removing any type of chip or scrap therefrom, since its movements are positive, are commensurate with the varying degree of work required of it during its working stroke, are confined to the point where the chips collect, and are independent of the movements of the machine parts, although the crank pin thereof is preferably driven from some moving part of the machine. It is not likely to get out of order since it is simple in construction and operation, is protected against operating shocks by the non-rigid arrangement of the blade, and the operating mechanism is located out of the chip-disposal area and readily accessible.

For a more complete understanding of the invention reference may be had to the accompanying drawings, in which Figure 1 is an elevation of a horizontal multiple-spindle chucking machine equipped with the chip-removing apparatus of this invention;

Figure 3 is an enlarged end view of the mechanism at the beginning of its working or forward stroke;

Figure 4 is a similar view of the mechanism at the completion of its forward or working stroke; and Figure 5 is a vertical section through the apparatus as seen along the line 5—5 of Figure 3.

Figure 1:
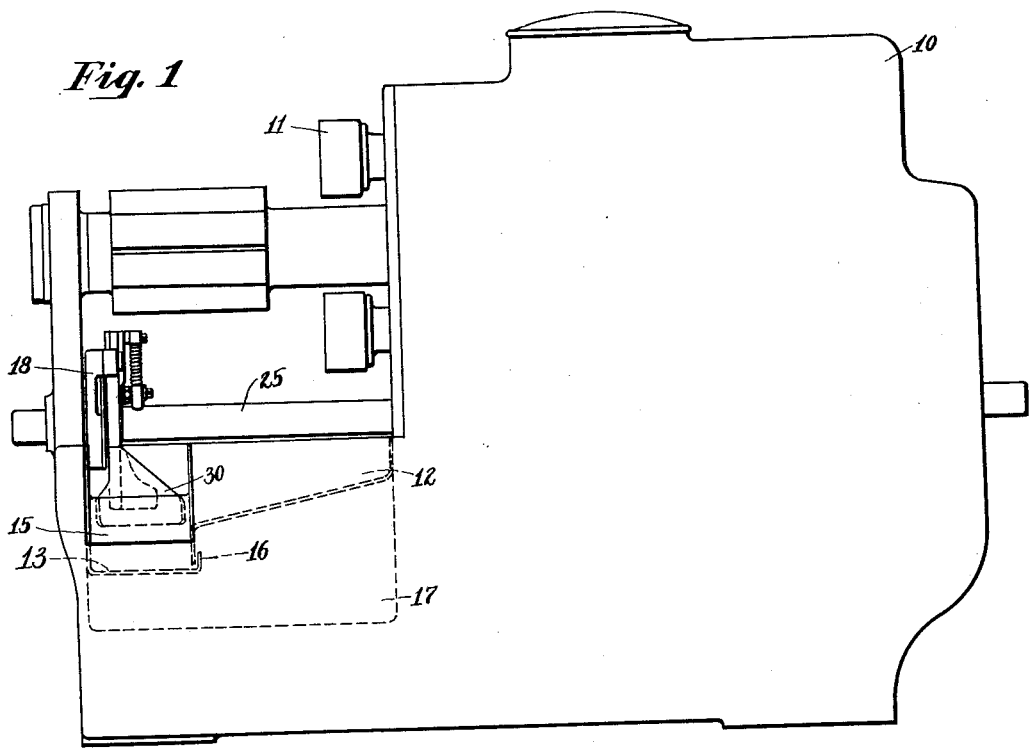
Figure 2:
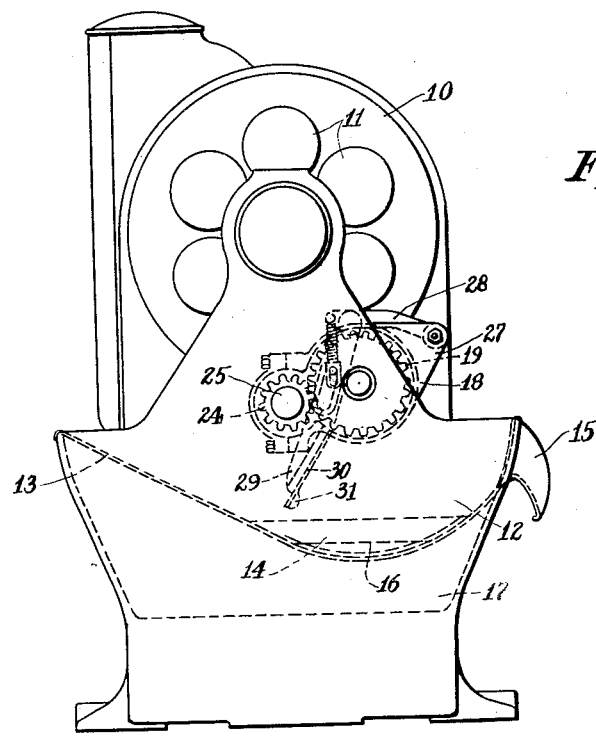
Figure 2 is an end view of the machine illustrating the arrangement of the chip-removing apparatus in respect to the chip- and tool lubricant-collecting basin.

In Figures 1 and 2 of the drawings, numeral 10 designates a horizontal multiple-spindle chucking machine of standard make, which is a representation of one type of metal-working machine to which the apparatus of this invention may be applied, it being understood that the new apparatus may be applied with equal facility to vertical chucking machines of the single- or multiple-spindle types, or any other metal-working machine in which the removal of chips is a problem.

Located below the chucks 11 of the machine 10 is a trough 12, which receives the chips and other scrap from the tooling of the work and the cutting or tool lubricant. The chips are flushed by the cutting lubricant out of trough 12 upon a plate 13 having downwardly sloping walls forming a sump or basin 14 having a curved bottom. The plate 13 is provided at one side of the machine with a discharge spout 15 aligned with the basin 14, as is illustrated especially in Figures 2 and 4. The basin 14 is provided with a side wall 16 which forms a dam over which the tool or cutting lubricant decants into a reservoir 17 from which it is pumped or otherwise drawn upon for recirculation to the work being tooled. In decanting over the dam 16 the cutting lubricant is separated from the chips which remain in the basin 14.

Bolted to the frame of the machine 10 by means of bolts 17 is a housing 18 containing a spur gear 19 having an integral shaft 20, which is journaled in a hub 21 of housing 18 on bushing 22 and is held in place axially by a nut and washer combination 23. Meshing with spur gear 19 is a pinion 24 mounted on shaft 25 of the chucking machine 10, so that spur gear 19 is rotated in accordance with the operation of the machine 10. Pinion 24 may be driven from any other suitable part of the machine, depending upon the construction of the latter and the location of the chip-removing apparatus. A shroud ring or a cover plate 26 on the open face of housing 18 substantially encloses spur gear 19 therein.

Formed integrally with housing 18 is a bracket 27 on which is pivoted a link 28. Pivoted on link 28 intermediate its ends by a pin 28' is a lever 29 which carries at its free end the blade or scoop 30, which is of substantial width so as to largely cover the bottom of the basin 14 when in contact therewith, as illustrated in Figure 5. The lateral edges of the blade 30 are provided with flanges 31 which provide the blade 30 with a scoop-like contour and serve to increase the total quantity of chips or scrap advanced by the blade 30 during its working stroke.

The lever 29 is provided intermediate its ends with an elongated slot 32 into which projects an eccentric crank pin 33 provided with a roller 34, which is held in place on pin 33 by means of the nut and washer combination 35, as illustrated especially in Figure 5.

Slidable on crank pin 33 and held in place thereon by a washer 36 is an eye 37 provided with an elongated slot 38. Secured by one end to eye 37 is a coil spring 39, the other end of which is secured to a block 40 pivoted on a pin 41 mounted on the end of link 28.

During the operation of the metal-working machine 10, chips resulting from the tooling operations performed thereby drop into the trough 12 and are flushed by the discharging tool or cutting lubricant into basin 14, the center of curvature of which is substantially coincident with the pivot point 28' of the lever 29. The function of the crank pin 33 on gear 19 is simply to elevate the blade or scoop 30 at the completion of its working stroke, carry it along the curved path marked A″ in Figure 4 to the position A, whereupon the continued downward movement of the crank pin 33 in a counter-clockwise direction releases the blade or scoop 30, which accordingly drops under the weight of its lever 29 and link 28, so that the lower edge thereof scrapes along the bottom of basin 14 as the blade is moved to the right along the path A′ indicated in Figure 4, to rake the chips out of the basin 14 and into the spout 15.

During the movement of the blade 30 along the path A″ the spring 39 exerts no pressure on the blade since the crank pin 33 lies in the upper end of the slot 38 of the spring eye 37. However, as the blade 30 is advanced along the path A′, the clearance provided by the slot 38 of spring eye 37 is taken up and the spring 39 exerts a gradually increasing pressure which compensates for the increasing weight of the accumulating mass of chips being removed by the blade 30 and this prevents lifting of the latter by the chips. Toward the end of the working stroke the clearance provided by slot 38 is entirely taken up and, at the end of the working stroke, spring 39 is distended, as illustrated in Figure 4.

During the entire cycle of operation of the apparatus crank pin 33 normally lies in the upper end of the slot 32 in lever 29, so that lever 29 is free to move upwardly at any time relatively to the crank pin 33 in the event that its blade 30 encounters during its downward starting stroke A or during its working stroke A′ an obstruction such as an unusually large piece of scrap or a jammed mass of chips. The blade 30 accordingly does not descend as far or rises to clear the obstruction without shock or undue load on the mechanism. The spring 39 permits this upward movement of the blade 30 at any time since the link 28 is pivoted and the drive between the lever 29 and the crank pin 33 is exerted through the spring 39.

The blade or scoop 30 begins its operating stroke at a point substantially beyond the largest mass of the accumulated chips and gradually moves them with increasing pressure to the discharge spout, and its return stroke is clear of the chips which have accumulated in the meantime, so that there can be no obstruction to its recovery movement. The chips and other scrap are accordingly scooped into discharge spout 15 as they accumulate in basin 14 during operation of the machine and the cutting lubricant continually overflows dam 16 and collects in reservoir 17 for re-use. The chips discharged by spout 15 are disposed of in any suitable way.

It will be seen that the new chip-removing apparatus of this invention adapts itself practically automatically to operating conditions to remove all kinds of chips, the largest and most irregular chips being removed with as great facility as the smaller or more regularly shaped chips. Simply by providing a basin 14 of appropriate curvature, the apparatus may be adapted to any machine, regardless of its nature, so long as it has a point at which the chips and the scrap accumulate.

I claim:

1. In a chip remover for metal-working machines having a chip-receiving container, the combination of a member engageable with a batch of chips in the container, and means for reciprocating the member to periodically engage and advance successive batches of chips in the container.

2. In a chip remover for metal-working machines having a chip-receiving container, the combination of a member engageable with a batch of chips in the container, and means periodically rendering said member effective to engage and advance corresponding batches of chips in the container.

3. In a chip remover for metal-working machines having a chip-receiving container, the combination of a member engageable with a batch of chips in the container but normally disengaged therefrom, and means for periodically engaging the member with successive batches of chips and advancing the member along the container to move the batches of chips therein.

4. In a chip remover for metal-working machines having a chip-receiving container, the combination of a member engageable with a batch of chips in the container, and oscillating driving means loosely connected to the member to cause it to periodically advance successive batches of chips in the container, the loose connection permitting relative movement between the member and the means in response to obstructions encountered by the member.

5. In a chip remover for metal-working machines having a chip-receiving container, the combination of a member engageable with a batch of chips in the container but normally disengaged therefrom, and means for engaging the member with the chips in the container, moving the member along the container to advance the chips therein and disengaging the member from the chips.

6. In a chip remover for metal-working machines having a chip-receiving container, the combination of a member engageable with a batch of chips in the container but normally disengaged therefrom, and means from which the member depends for reciprocating the latter to advance successive batches of chips in the container.

7. In a chip remover for metal-working machines having a chip-receiving container, the combination of a member engageable with a batch of chips in the container, and means alternately lifting and releasing the member to permit it to fall by gravity into contact with the chips and thereafter moving it along the container to advance the chips therein.

8. In a chip remover for metal-working machines having a chip-receiving container, the combination of a member engageable with a batch of chips in the container, and an eccentric driving element connected to the member for dropping the member into engagement with the chips, moving the element to advance the chips in the container, and retracting the element to initial operating position.

9. In a chip remover for metal-working machines having a chip-receiving container, the combination of a member engageable with a batch of chips in the container, a pivoted arm mounting the member, and an eccentric driving element engaging the member for continuously moving it through an orbit to cause it to periodically engage and advance batches of chips in the container.

10. In a chip remover for metal-working machines having a chip-receiving container, the combination of a member engageable with a batch of chips in the container, a movable supporting element for the member, and a mechanism for oscillating the element to continuously move the member through an orbit in which it periodically advances batches of chips in the container, and resilient means in the mechanism for varying the pressure of the member on the chips as the member advances them.

11. In a chip remover for metal-working machines having a chip-receiving container, the combination of a member engageable with a batch of chips in the container, a pivoted arm mounting the member, and an eccentric driving element loosely connected to the arm to effect an orbital movement of the member in which it periodically advances chips in the container, the loose connection permitting relative movement between the arm and the driving element in response to obstructions encountered by the member.

12. In a chip remover for metal-working machines having a chip-receiving container, the combination of a member engageable with a batch of chips in the container, a pivoted arm mounting the member, an eccentric driving element loosely connected to the arm to effect an orbital movement of the member in which it periodically advances chips in the container, and a second connection between the arm and the driving element including a spring for varying the degree of pressure of the member on the chips in accordance with the increasing weight of the chips accumulated by the member.

13. In a chip remover for metal-working machines having a chip-receiving container, the combination of a member engageable with a batch of chips in the container, a movable support, an arm pivoted thereon and having a slot, and a crank pin moving in the slot to successively advance the member along the container to move chips therein, lift it out of engagement with the chips, retract it to an initial position and drop it into engagement with a new batch of chips in the container in response to the weight of the support and arm.

14. In a chip remover for metal-working machines having a chip-receiving container, the combination of a member engageable with a batch of chips in the container, a movable support, an arm pivoted thereon and having a slot, a crank pin moving in the slot to successively advance the member along the container to move chips therein, lift it out of engagement with the chips, retract it to an initial position and drop it into engagement with a new batch of chips in the container in response to the weight of the support and arm, and a spring connecting the crank pin to the support for increasing the pressure of the member on the chips to compensate for the increasing weight thereof.

15. In a chip remover for metal working machines, the combination of a pivoted blade for engaging and moving the chips, a container for receiving the chips and having a curvature substantially conforming to the arc described by the blade during the chip moving operation of the latter, and means for oscillating the blade to discharge successive batches of chips from the container.

16. In a metal-working machine, the combination of a trough for receiving the chips and the usual lubricant resulting from the tooling operations of the machine, a basin into which the trough discharges the lubricant and chips, a lubricant reservoir at a lower level than the basin, a dam in the basin over which the lubricant decants into the reservoir, and an oscillating blade for discharging the chips from the basin.

17. The combination with a metal-working machine having a horizontally disposed rotatable shaft, of a receptacle for the cuttings of the machine located below the shaft and a pusher for the cuttings actuated in correspondence with the rotation of the shaft to reciprocate forwardly and rearwardly over different paths below the shaft, the pusher moving in a path close to the bottom of the receptacle during its forward movement, so as to propel cuttings over its surface to an outlet.

ARTHUR J. LEWIS.